US010757095B1

(12) United States Patent
Atchity et al.

(10) Patent No.: US 10,757,095 B1
(45) Date of Patent: Aug. 25, 2020

(54) UNIX PASSWORD REPLICATION TO A SET OF COMPUTERS

(71) Applicant: Sprint Communications Company L.P., Overland Park, KS (US)

(72) Inventors: Gregory J. Atchity, Overland Park, KS (US); Bruce E. Hoffmann, Holt, MO (US); Christopher D. Smith, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 230 days.

(21) Appl. No.: 16/003,003

(22) Filed: Jun. 7, 2018

(51) Int. Cl.
*H04L 29/06* (2006.01)
*G06F 21/46* (2013.01)
*H04L 9/08* (2006.01)
*H04L 9/06* (2006.01)

(52) U.S. Cl.
CPC ......... *H04L 63/0846* (2013.01); *G06F 21/46* (2013.01); *H04L 9/0643* (2013.01); *H04L 9/0897* (2013.01); *H04L 63/102* (2013.01)

(58) Field of Classification Search
CPC . H04L 63/0846; H04L 9/0897; H04L 63/102; H04L 9/0643; G06F 21/46
USPC .......................................................... 726/6
See application file for complete search history.

(56) References Cited

U.S. PATENT DOCUMENTS

| | | | | | |
|---|---|---|---|---|---|
| 5,838,903 | A | * | 11/1998 | Blakely, III | G06F 21/31 726/5 |
| 7,103,912 | B2 | * | 9/2006 | Xia | G06F 21/31 726/10 |
| 7,181,620 | B1 | * | 2/2007 | Hur | H04L 9/083 713/168 |
| 7,299,359 | B2 | * | 11/2007 | Hurley | G06F 21/46 713/182 |
| 8,094,812 | B1 | * | 1/2012 | Tsang | H04L 9/3226 380/28 |
| 8,424,067 | B2 | * | 4/2013 | Keohane | H04L 63/0846 713/182 |
| 8,826,396 | B2 | * | 9/2014 | Jancula | G06F 21/46 726/6 |
| 9,355,233 | B1 | * | 5/2016 | Chen | H04L 9/3297 |
| 9,438,419 | B1 | * | 9/2016 | Aggarwal | H04L 9/0863 |
| 9,754,101 | B2 | * | 9/2017 | Jakobsson | H04L 63/06 |
| 2002/0013711 | A1 | * | 1/2002 | Ahuja | G06Q 40/02 709/206 |
| 2003/0005048 | A1 | * | 1/2003 | Risalvato | G06F 8/51 709/203 |

(Continued)

*Primary Examiner* — David J Pearson
*Assistant Examiner* — Badri Champakesan

(57) ABSTRACT

A method of replicating a UNIX password from a source computer to a delimited set of target computers performed by an application executing on a computer system. The method comprises receiving an identity of a source computer, determining a date of a UNIX password associated with a user identity configured on the source computer, determining that the UNIX password associated with the user identity configured on the source computer is less than a predefined number of days old, receiving identities of a plurality of target computers, reading an encrypted UNIX password associated with the user identity from the source computer, and, for each of the target computers, writing the encrypted UNIX password into an entry associated to the user identity in a password file on the target computer.

4 Claims, 5 Drawing Sheets

(56) References Cited

U.S. PATENT DOCUMENTS

| | | | | |
|---|---|---|---|---|
| 2004/0250141 | A1* | 12/2004 | Casco-Arias | G06F 21/46 |
| | | | | 726/6 |
| 2006/0271789 | A1* | 11/2006 | Satomura | G06F 21/41 |
| | | | | 713/183 |
| 2007/0039042 | A1* | 2/2007 | Apelbaum | H04L 9/14 |
| | | | | 726/6 |
| 2007/0169202 | A1* | 7/2007 | Goldberg | G06Q 20/10 |
| | | | | 726/26 |
| 2012/0284786 | A1* | 11/2012 | Somani | H04L 63/0815 |
| | | | | 726/7 |
| 2014/0137265 | A1* | 5/2014 | Dubman | G06F 21/6245 |
| | | | | 726/27 |
| 2014/0208404 | A1* | 7/2014 | Brouwer | H04L 63/062 |
| | | | | 726/6 |
| 2014/0325622 | A1* | 10/2014 | Luk | H04L 63/0823 |
| | | | | 726/6 |
| 2015/0220715 | A1* | 8/2015 | Kim | G06F 21/46 |
| | | | | 726/18 |
| 2017/0078322 | A1* | 3/2017 | Seiver | H04L 63/1433 |
| 2017/0177613 | A1* | 6/2017 | Sharma | G06F 21/45 |
| 2020/0036705 | A1* | 1/2020 | Lee | H04L 63/0838 |

* cited by examiner

UNIX PASSWORD REPLICATION TO A SET OF COMPUTERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When a user logs in to a UNIX computer, the login interface challenges the user to provide a user name and a password to obtain access to the execution environment provided by the computer. Typically password information is stored in an /etc/passwd file and in an /etc/shadow file. The /etc/passwd file typically grants general read permission (any user can read) but restricts write permission to superusers or root users. The /etc/shadow file, by contrast, typically restricts access permissions to superusers or root users only. The /etc/passwd file comprises an entry for each user name that associates the user name to a group identity, a home directory, and a command shell. The /etc/passwd file entry for the user name may also identify the user's password in clear text, but this is considered an unsecure practice, and it is now considered best practice to indicate in the /etc/passwd file entry only that the password is encrypted. The encrypted password is then stored in an entry indexed by the user name in the /etc/shadow file. The encrypted password indicates the hashing function used to encrypt the password. The entry in the /etc/shadow file also indicates a date the password was created.

When a user attempts to log in on a UNIX computer, typically a login daemon process challenges the user to input his or her user name and password in clear text. The login daemon maps the user name to the /etc/password entry associated with that user and may determine that the password is encrypted. The login daemon then maps the user name to the /etc/shadow entry associated with that user and looks up the encrypted password. The login daemon determines from the encrypted password what hashing function was used to encrypt the password, uses that hashing function to encrypt the input password, and compares the now encrypted input password to the encrypted password read from the /etc/shadow entry associated with the user. If the two values match, the user is granted access to the UNIX computer. It is understood that the access that is granted may be restricted in various ways based on the privileges and identities attached to that user identity. That is, the user may be able to read and write some files, read but not write other files, and neither write nor read yet other files.

When a user changes his or her password, the UNIX computer may first check that the proposed new password satisfies password complexity requirements. It may be desirable for passwords to be sufficiently complex to make guessing the password computationally difficult, whereby to mitigate the risk of an unauthorized user gaining access to the computer by spoofing an authorized user and guessing that user's password. Such password complexity requirements may specify one or more of a minimum password length, a minimum number of non-alphabetic characters, a minimum number of digits, and/or a minimum number of capital letters. Password complexity requirements may further exclude passwords that are enumerated in a dictionary of common passwords.

When the user changes his or her password and the proposed new password satisfies any password complexity requirements enforced on the UNIX computer, the password may be encrypted and written into the entry associated with the user in the /etc/shadow file and the indication of when the password was last changed is updated. It will be appreciated that there are a plurality of variants of UNIX computer systems in use around the world and that the password framework of any given UNIX computer system may vary somewhat from the general description above.

SUMMARY

In an embodiment, a method of replicating a UNIX password from a source computer to a delimited set of target computers performed by an application executing on a computer system is disclosed. The method comprises receiving an identity of a source computer, determining a date of a UNIX password associated with a user identity configured on the source computer, and determining that the UNIX password associated with the user identity configured on the source computer is less than a predefined number of days old. The method further comprises receiving identities of a plurality of target computers, reading an encrypted UNIX password associated with the user identity from the source computer, and, for each of the target computers, writing the encrypted UNIX password into an entry associated to the user identity in a password file on the target computer.

In another embodiment, a method of replicating a UNIX password from a source computer to a delimited set of target computers performed by an application executing on a computer system is disclosed. The method comprises receiving an identity of a source computer, receiving identities of a plurality of target computers, and reading an encrypted UNIX password associated with the user identity from the source computer. The method further comprises looking up a UNIX password complexity requirement of the source computer, for each target computer, looking up a UNIX password complexity requirement of the target computer, for each target computer, comparing the UNIX password complexity requirement of the target computer to the UNIX password complexity requirement of the source computer, and, for each of the target computers whose UNIX password complexity requirement is compatible with the UNIX password complexity requirement of the source computer, writing the encrypted UNIX password into an entry associated to the user identity in a password file on the target computer.

In yet another embodiment, a method of replicating a UNIX password from a source computer to a delimited set of target computers performed by an application executing on a computer system is disclosed. The method comprises receiving an identity of a source computer, receiving identities of a plurality of target computers, and reading an encrypted UNIX password associated with the user identity from the source computer, where the encrypted UNIX password indicates a secure hashing function. The method further comprises, for each of the target computers, determining secure hashing functions supported by the target computer and, for each of the target computers that support the secure hashing function indicated in the encrypted UNIX password, writing the encrypted UNIX password into an entry associated to the user identity in a password file on the target computer.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
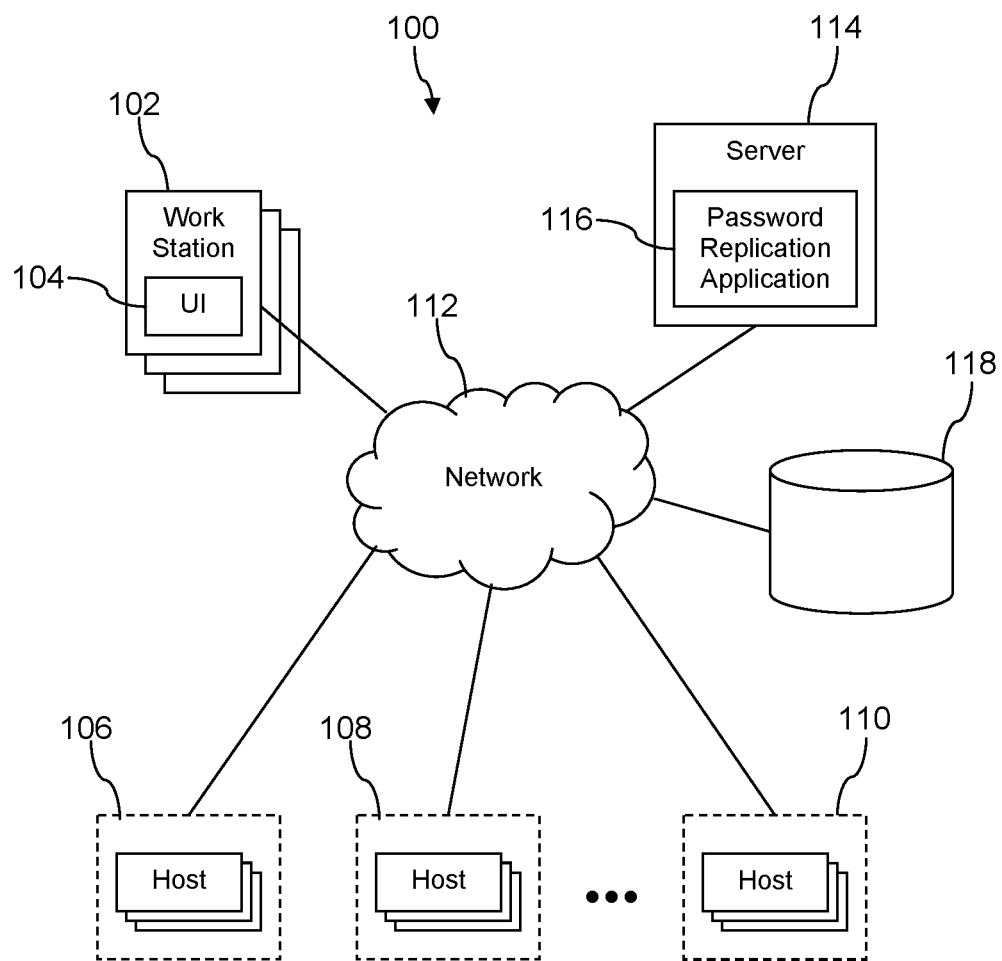
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Maintaining the passwords of a user on a plurality of computer systems may be complicated. The user may have different user identities on different ones of the computer systems. The user may have different passwords on different ones of the computer systems. The user's passwords on these different computer systems may have different expiration dates (many computer systems require a user to change their password after a predefined interval of time if the user has not already changed his or her password). Different ones of the computer systems may impose different password complexity requirements or password complexity restrictions. The present disclosure teaches a password replication tool that provides new information technology solutions for this technical problem. The password replication tool is described in examples of changing and replicating UNIX passwords, but the techniques and approaches disclosed herein may be advantageously applied in computer systems using other operating systems.

The password replication application provides a user interface (UI) to a user that the user invokes from his or her work station. The UI prompts the user to identify a source UNIX host from which the password replication application will obtain the user's encrypted password. In an embodiment, the password replication application may check the date of the encrypted password and terminate the replication session if the encrypted password is more than a predefined threshold time interval old, for example more than 7 days old. This date checking can help honor the objective of compelling the user to change his or her password periodically, whereby to reduce the security vulnerability of the target UNIX hosts. The UI also prompts the user to identify a plurality of target UNIX hosts to which the encrypted password is to be replicated. The password replication application may then replicate the encrypted password from the source UNIX host to one or more of the target UNIX hosts, for example by writing the encrypted password into an entry associated with the user in the /etc/shadow file of the target UNIX hosts.

The encrypted password read from the source UNIX host identifies an encryption method used to encrypt the password. Before replicating the encrypted password to each target UNIX host, the password replication application first verifies that the target UNIX host supports the encryption method used to encrypt the password on the source UNIX host. If the target does not support the subject encryption method, replication of the encrypted password on that target host is skipped or rejected.

In an embodiment, the password replication application determines a password complexity requirement on the source UNIX host. Before copying the encrypted password to each target UNIX host, the password replication application first verifies that the password complexity requirement on the source UNIX host is at least as strict as the password complexity requirement on that target UNIX host. If the password complexity requirement on the source UNIX host is weaker than the password complexity requirement on a target UNIX host, replication of the encrypted password on that target host is skipped or rejected.

In an embodiment, the password replication application may require that the user identity of the user be the same on each of the UNIX hosts identified as targets for the password replication. In this case, the password replication may reject replication of the encrypted password on a target host that does not have a password file defined for the subject user identity. In another embodiment, the password replication application may consult a data store to determine a plurality of user identities associated with a user and search each of the target hosts for each of those user identities. When the password replication application finds an entry in the password file (i.e., the /etc/shadow file) associated with any user identity associated with the subject user, the password replication application attempts to replicate the encrypted password subject to the checks and constraints described above.

It will be appreciated that the password replication application described herein can support strong password security in computer systems while at the same time easing the burden on users of maintaining their passwords current on many host computers. Some information technology workers work in network domains that comprise hundreds of UNIX hosts and even thousands of UNIX hosts. There may be advantages for a single user to have different user identities on different groups of UNIX hosts. For example, a user may have a first user identity on a first group of 150 hosts, a second user identity on a second group of 500 hosts, and a third user identity on a third group of 75 hosts. Again, the password replication application described herein can promote both good password security over different user identities of the same user and also reduce the burden on that user of maintaining his or her passwords current.

Turning now to FIG. 1, a system 100 is described. In an embodiment, the system 100 comprises a plurality of work stations 102, each capable of presenting a user interface (UI) 104. A user may access and interact with UNIX hosts 106, 108, 110 via a network 112 from his or her work station 102. The user may interact with the UNIX hosts 106, 108, 110 by logging in from the work station 102 and executing various remote commands, for example shell commands or UNIX system calls. The UI 104 may be used to invoke a password replication application 116 executing on a server computer 114. The password replication application 116 may replicate a password associated with a user to a plurality of the hosts 106, 108, 110. In an embodiment, the system 100 may further comprise a data store 118 that defines a plurality of user identities for at least some of the users of the system 100. In another embodiment, however, the system may not comprise the data store 118. The network 112 comprises one or more public networks, one or more private networks, or a combination thereof. The password replication application 116 may be provided as a script or other form of computer logic for executing on the server computer 114.

Each of the UNIX hosts 106, 108, 110 may comprise an /etc/password file and an /etc/shadow file that may define login accounts for users, an entry for each user of the host in its /etc/password file and in its /etc/shadow file. A user may update his or her password on one of the UNIX hosts 106, 108, 110, for example by invoking the UNIX change password command (e.g., 'passwd' command). The new password is encrypted and stored in the /etc/shadow file on that host 106, 108, 110 and the date the new password was created will also be stored in the /etc/shadow file on that host 106, 108, 110.

The user may then employ the UI 104 to invoke the password replication application 116 to replicate this new password from the subject UNIX host, referred to herein as the source UNIX host, to one or more other UNIX hosts 106, 108, 110, referred to herein as target UNIX hosts. The user may use the UI 104 to identify the source UNIX host and the target UNIX hosts. The user may further use the UI 104 to identity his or her user identity on the source UNIX host. In an embodiment, the UI 104 provides a list of UNIX hosts 106, 108, 110 that the user may select by clicking to identify target UNIX hosts. The UNIX hosts 106 may be associated with a first user identity of the user, the UNIX hosts 108 may be associated with a second user identity of the same user, and the UNIX hosts 110 may be associated with a third user identity of the same user. For example, user John Smith may be associated with a first user identity of Falstaff on the UNIX hosts 106, with a second user identity of Lear on the UNIX hosts 108, and with a third user identity of Iago on the UNIX hosts 110.

In an embodiment the password replication application 116 may restrict the replication of UNIX passwords to UNIX hosts 106, 108, 110 that have a login associated with the same user identity. Thus, in this embodiment, the password replication application 116 may restrict John Smith to replicating his password to a single one of his user identities during one invocation of the password replication application 116. To replicate his password associated with his user identity Falstaff, John Smith can identify any UNIX hosts 106 but not any of UNIX hosts 108 or 110. To replicate his password associated with his user identity Lear, John Smith can identify any UNIX hosts 108 but not any of UNIX hosts 106 or 110. To replicate his password associated with his user identity Iago, John Smith can identify any UNIX host 110 but not any of the UNIX hosts 106 or 108. In an alternative embodiment, however, the password replication application 116 may look up all the user identities associated with John Smith in the data store 118 and replicate the encrypted UNIX password of the source UNIX host to target UNIX hosts identified from any of UNIX hosts 106, 108, 110, using the user identity John Smith has on each identified target UNIX host 106, 108, 110.

To replicate the UNIX password from the source UNIX host to one target UNIX host, the password replication application 116 reads the encrypted UNIX password associated with the user from the source UNIX host (i.e., from the /etc/shadow file entry associated with that user identity) and writes that encrypted UNIX password into the /etc/shadow file entry associated with that same user identity on the target UNIX host. A well-known UNIX system call is available to appropriately privileged users and/or executables to overwrite encrypted passwords in the /etc/shadow file. This same process can be repeated for each of a plurality of identified target UNIX hosts, with the exception that the encrypted UNIX password may only be read from the source UNIX host once when the password replication application 116 is invoked from the UI 104.

The password replication application 116 may determine the date the password of the user was changed in the source UNIX host and compare it to a predefined threshold. The date the password of the user was changed in the source UNIX host may be determined by reading the entry associated with the user identity in the /etc/shadow file of the source UNIX host. It is understood that the encrypted password and the date of the UNIX password may be accomplished at the same time, by a single read from the entry in the /etc/shadow file of the source UNIX host. If the password on the source UNIX host is older than that predefined threshold, the password replication application 116 can reject the password replication request and notify the UI 104 and the user that the user's password on the source UNIX host needs to have been changed within the predefined threshold period of time. For example, the predefined threshold period of time may be about 3 days, about 7 days, about 14 days, or some other predefined period of time. This feature may promote the spirit of promoting system security by aging out passwords.

The password replication application 116 may determine a password complexity requirement on the source UNIX host. The password replication application 116 may then determine the password complexity requirement on each target UNIX host and compare that to the password complexity requirement of the source UNIX host. This may be referred to in some contexts as determining if the password complexity requirement of the target UNIX host is compatible with the password complexity requirement of the source UNIX host. If the password complexity requirement of a target UNIX host is stricter than the complexity requirement of the source UNIX host, the replication of the password to that target UNIX host may be rejected. Said in other words, if the password complexity requirement of the source UNIX host is weaker than the complexity requirement of the target UNIX host, the replication of the password to that target UNIX host may be rejected. In an embodiment, when the complexity requirement of the source UNIX host and a target UNIX host are equal, the password complexity requirement of the target UNIX host is deemed compatible with the password complexity requirement of the source UNIX host. When the password replication application 116 completes execution, it may provide the UI 104 with a list of one or more target UNIX hosts whose passwords were not updated (e.g., the encrypted password of the source UNIX host was not replicated to the listed target UNIX hosts) due to one or more failed check.

The password replication application 116 may determine the hashing functions supported by a target UNIX host and determine if the target UNIX host supports the hashing function used to encrypt the password on the source UNIX host. If the target UNIX host does not support the hashing function used to encrypt the password on the source UNIX host, the replication of the password to that target UNIX host is rejected.

Figure 2:
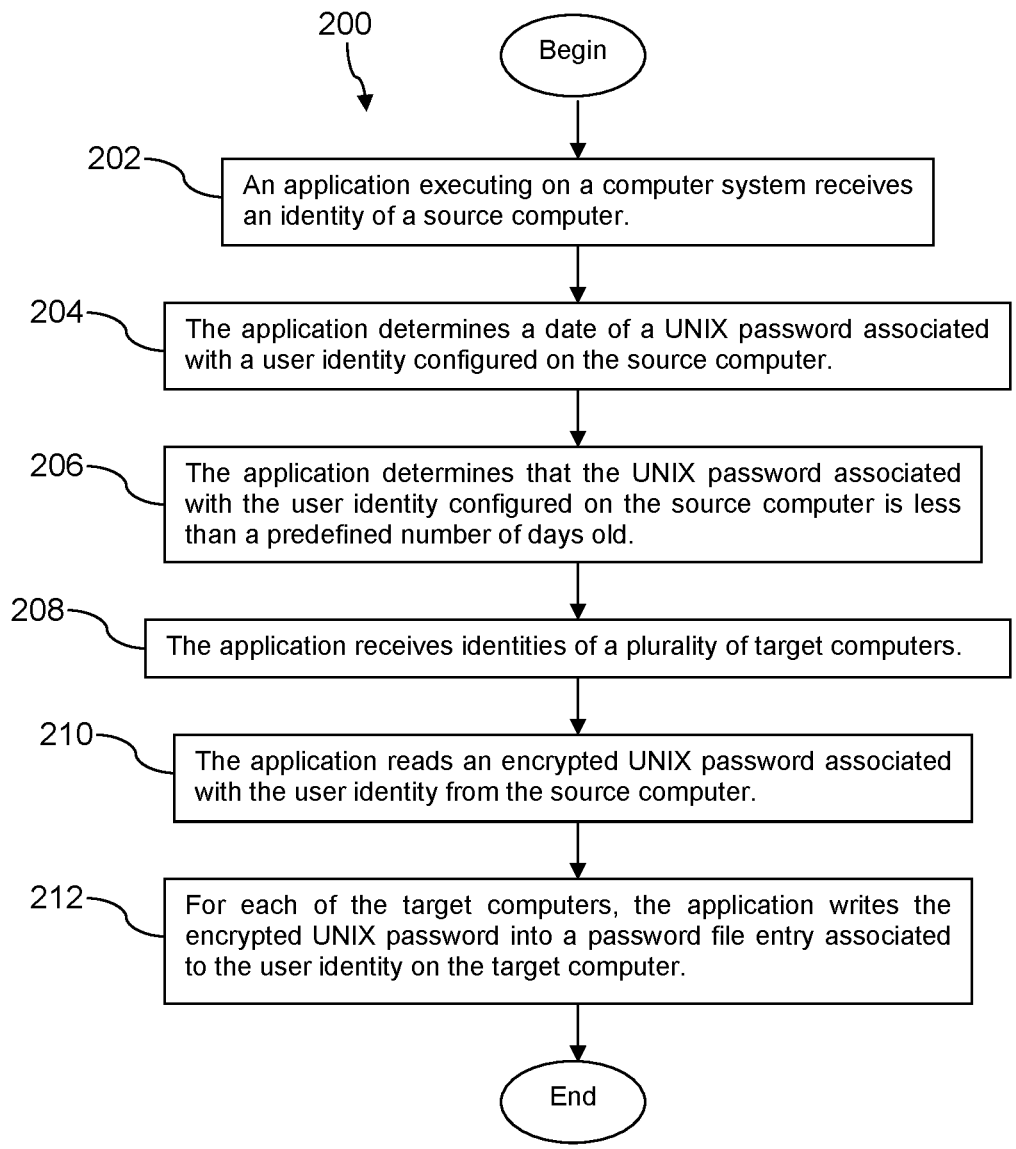
FIG. 2 is a flow chart of a method according to an embodiment of the disclosure.

Turning now to FIG. 2, a method 200 is described. The method 200 may be performed by an application or script executing on a computer system, for example the password replication application 116 described above with reference to FIG. 1. At block 202, an application executing on a computer system receives an identity of a source computer. At block 204, the application determines a date of a UNIX password associated with a user identity configured on the source computer. At block 206, the application determines that the UNIX password associated with the user identity configured on the source computer is less than a predefined number of days old. This may entail determining that the UNIX password is less than 3 days old, is less than 7 days old, is less than 14 days old, or less than some other predefined number of days old. If the UNIX password of the source UNIX host is too old (i.e., is older than the predefined number of days) the method 200 may complete without replicating the UNIX password of the source UNIX host to any target UNIX hosts. In this case, the application may generate an appropriate failure message indicating the need to first update the UNIX password on the source UNIX host to work station 102 for presentation by the UI 104 to the user.

At block 208, the application receives identities of a plurality of target computers. At block 210, the application reads an encrypted UNIX password associated with the user identity from the source computer. In an embodiment, the method 200 may combine the processing of block 204 and block 210. Said in other words, the password replication application 116 may read the entry associated with the user identity in the /etc/shadow file of the source UNIX host, thereby determining the date of the UNIX password and determining the encrypted UNIX password in one read access. At block 212, for each of the target computers, the application writes the encrypted UNIX password into a password file entry associated to the user identity on the target computer, for example writes the encrypted UNIX password into an entry associated with the user identity in the /etc/shadow file of the target UNIX host.

Figure 3:
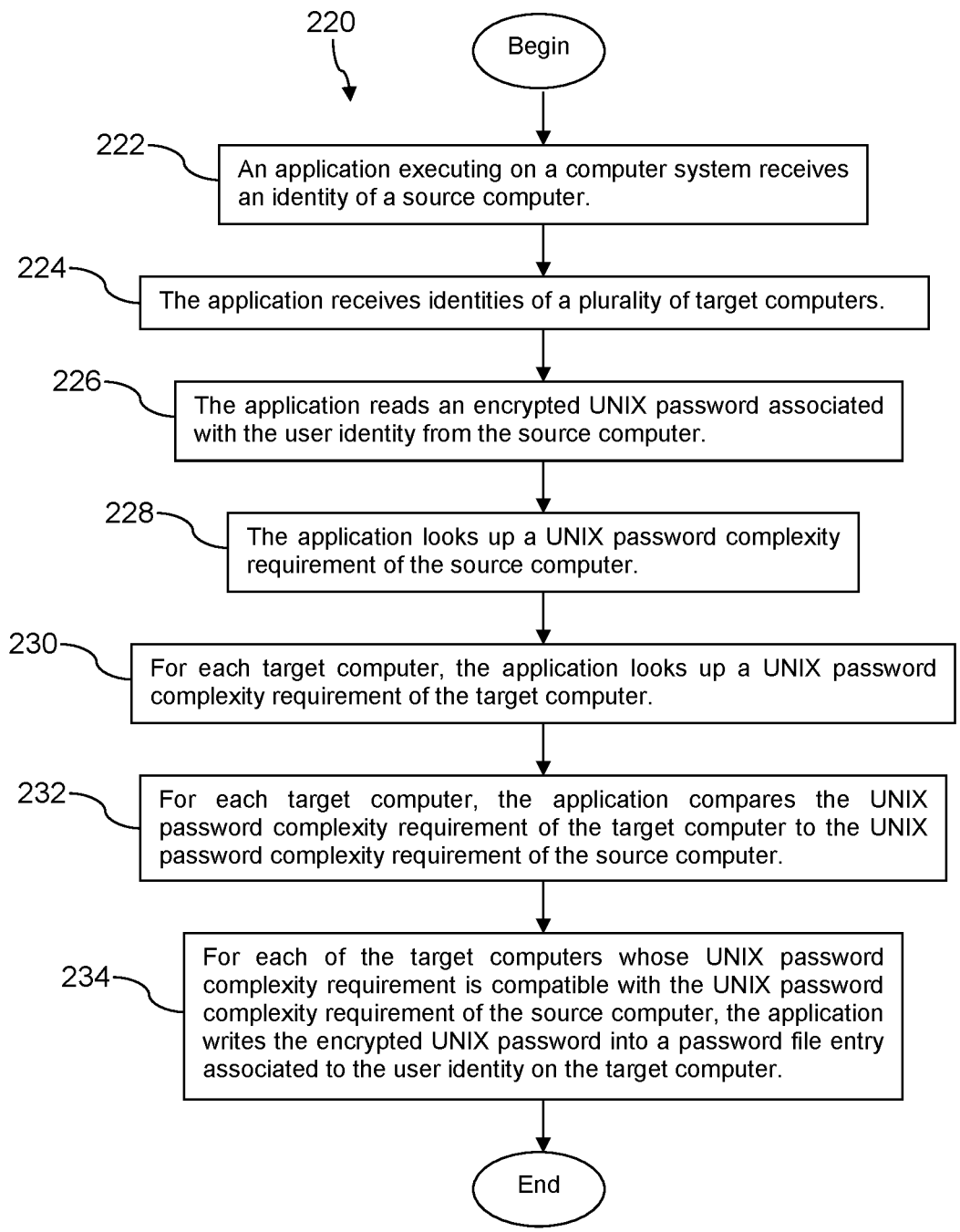
FIG. 3 is a flow chart of another method according to an embodiment of the disclosure.

Turning now to FIG. 3, a method 220 is described. The method 220 may be performed by an application or script executing on a computer system, for example the password replication application 116 described above with reference to FIG. 1. At block 222, an application executing on a computer system receives an identity of a source computer. At block 224, the application receives identities of a plurality of target computers. At block 226, the application reads an encrypted UNIX password associated with the user identity from the source computer.

At block 228, the application looks up a UNIX password complexity requirement of the source computer. The processing of block 228 may be performed, in part, by the application invoking a shell script or other logic that dynamically determines the UNIX password complexity requirement on the source computer. At block 230, for each target computer, the application looks up a UNIX password complexity requirement of the target computer. The processing of block 230 may be performed, in part, by the application invoking a shell script or other logic that dynamically determines the UNIX password complexity requirement on the target computer. At block 232, for each target computer, the application compares the UNIX password complexity requirement of the target computer to the UNIX password complexity requirement of the source computer. At block 234, for each of the target computers whose UNIX password complexity requirement is compatible with the UNIX password complexity requirement of the source computer, the application writes the encrypted UNIX password into a password file entry associated to the user identity on the target computer. If the password complexity requirement of the source UNIX host is weaker than the password complexity requirement of the target UNIX host, the UNIX password complexity requirement of the target UNIX host is deemed incompatible with the UNIX password complexity requirement of the source UNIX host, and the password is not replicated to that target UNIX host. A list of target UNIX hosts identified in block 224 that have not had their passwords updated by the method 220 may be generated by the application and presented to the user by the UI 104 on the user's work station 102.

Figure 4:
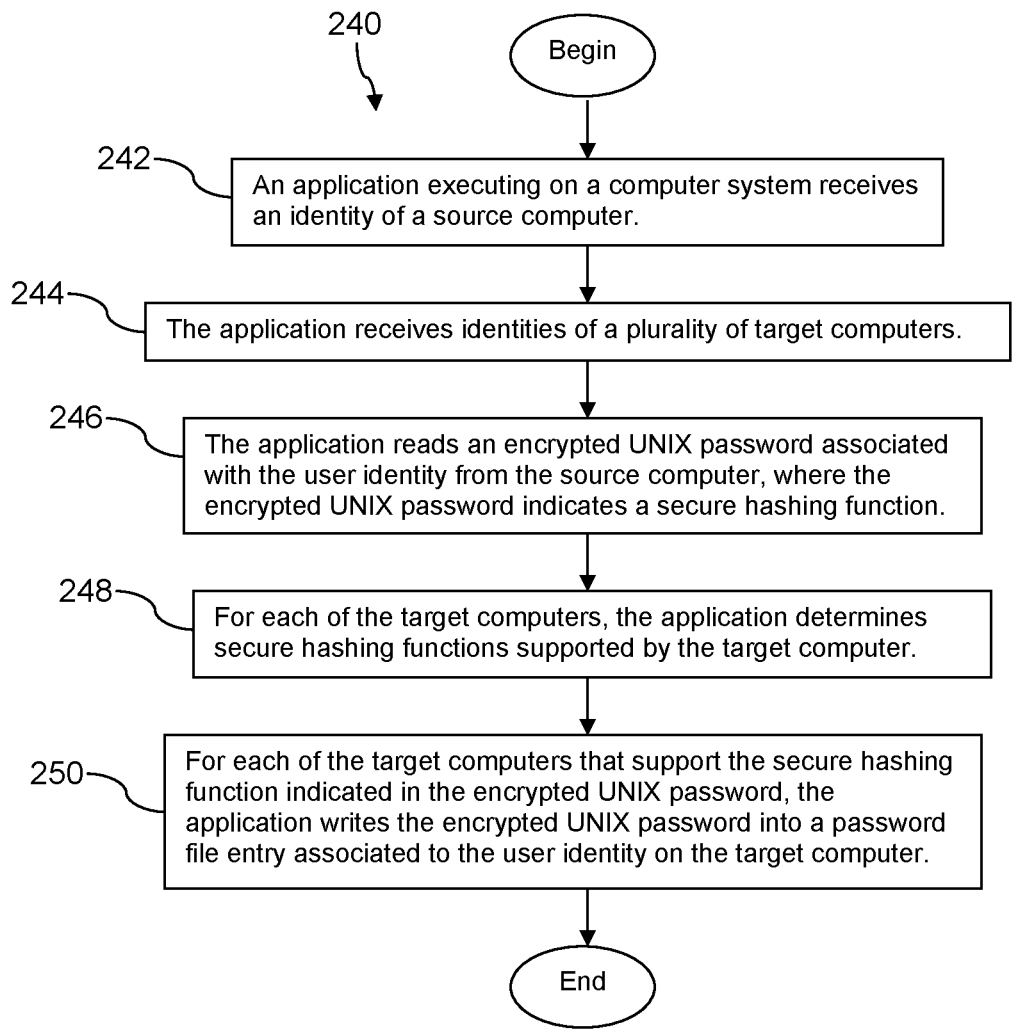
FIG. 4 is a flow chart of a method according to yet another embodiment of the disclosure.

Turning now to FIG. 4, a method 240 is described. The method 240 may be performed by an application or script executing on a computer system, for example the password replication application 116 described above with reference to FIG. 1. At block 242, an application executing on a computer system receives an identity of a source computer. At block 244, the application receives identities of a plurality of target computers. At block 246, the application reads an encrypted UNIX password associated with the user identity from the source computer, where the encrypted UNIX password indicates a secure hashing function. For example, the application reads an entry associated with the user identity in the /etc/shadow file on the source UNIX host.

At block 248, for each of the target computers, the application determines secure hashing functions supported by the target computer. At block 250, for each of the target computers that support the secure hashing function indicated in the encrypted UNIX password, the application writes the encrypted UNIX password into a password file entry associated to the user identity on the target computer. A list of target UNIX hosts identified in block 244 that have not had their passwords updated by the method 240 may be generated by the application and presented to the user by the UI 104 on the user's work station 102.

Figure 5:
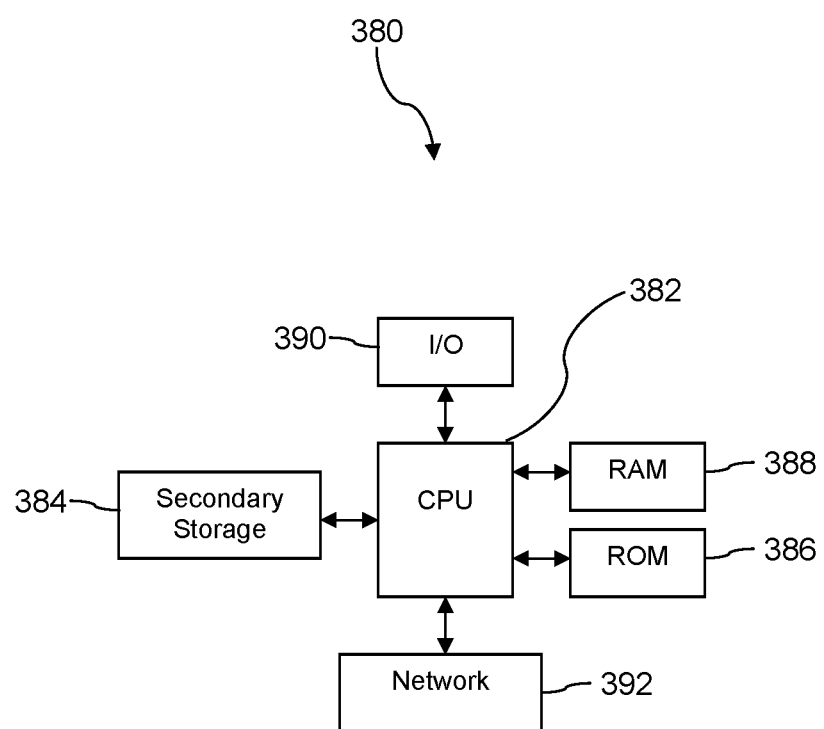
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of replicating a UNIX password from a source computer to a delimited set of target computers performed by an application executing on a computer system, comprising:
   receiving an identity of a source computer;
   receiving identities of the target computers;
   reading an encrypted UNIX password associated with a user identity from the source computer;
   for each target computer, determining whether the user identity or another identity corresponding to the user identity, and a corresponding existing password, are included in a password file of the target computer, wherein the password file is an /etc/shadow file;
   looking up a UNIX password complexity requirement of the source computer;
   for each target computer, looking up a UNIX password complexity requirement of the target computer;
   for each target computer, comparing the UNIX password complexity requirement of the target computer to the UNIX password complexity requirement of the source computer;
   for each of the target computers whose UNIX password complexity requirement is not stronger than the UNIX password complexity requirement of the source computer, writing the encrypted UNIX password into a first entry associated to the user identity in the password file on the target computer;
   for each of the target computers whose UNIX password complexity requirement is stronger than the UNIX password complexity requirement of the source computer, rejecting writing of the encrypted UNIX password into the first entry associated to the user identity in the password file on the target computer; and
   for each of the target computers for which the user identity or another identity corresponding to the user identity is not stored in the password file, rejecting writing of the encrypted UNIX password to the target computer.

2. The method of claim 1, wherein reading the encrypted UNIX password associated with the user identity from the source computer comprises reading a second entry associated with the user identity in an /etc/shadow file on the source computer.

3. The method of claim 1, determining that the UNIX password associated with the user identity configured on the source computer is less than 7 days old.

4. The method of claim 1, determining that the UNIX password associated with the user identity configured on the source computer is less than 3 days old.

* * * * *